US005986896A

United States Patent [19]

Gibart et al.

[11] Patent Number: 5,986,896

[45] Date of Patent: Nov. 16, 1999

[54] PROGRAMMABLE CONTROLLER HAVING A SYSTEM FOR REDUCING ENERGY CONSUMPTION OF RELAY OUTPUTS

[75] Inventors: Anthony G. Gibart, New Berlin; Jack L. Covault, Waukesha, both of Wis.

[73] Assignee: Allen-Bradley Company, LLC, Milwaukee, Wis.

[21] Appl. No.: 09/163,935

[22] Filed: Sep. 29, 1998

[51] Int. Cl.[6] .......................... H02M 3/335; H02M 7/537

[52] U.S. Cl. .............................................. 363/16; 363/131

[58] Field of Search ................................. 363/15, 16, 20, 363/21, 95, 97, 131

[56] References Cited

U.S. PATENT DOCUMENTS

| | | | |
|---|---|---|---|
| 3,590,334 | 6/1971 | Baker | 307/235 |
| 4,360,740 | 11/1982 | Conard | 307/134 |
| 4,755,132 | 7/1988 | Geary | 431/6 |
| 4,833,565 | 5/1989 | Bauer et al. | 361/154 |
| 4,959,746 | 9/1990 | Hongel | 361/13 |
| 5,255,152 | 10/1993 | Estes, III et al. | 361/160 |

*Primary Examiner*—Matthew Nguyen

*Attorney, Agent, or Firm*—Robert A. Van Someren; John M. Miller; John J. Horn

[57] ABSTRACT

A programmable controller reduces the power used by the relays. The controller design permits energization of relay coils without subsequent maintenance of the relatively high voltage required for energization. The design permits the voltage across the relay to be lowered to an activated relay coil maintenance level with a design that minimizes the space required for the relay circuitry.

20 Claims, 4 Drawing Sheets

PROGRAMMABLE CONTROLLER HAVING A SYSTEM FOR REDUCING ENERGY CONSUMPTION OF RELAY OUTPUTS

FIELD OF THE INVENTION

The present invention relates generally to programmable controllers, and particularly to a programmable controller having a system for reducing the energy used by the relay outputs.

BACKGROUND OF THE INVENTION

Controllers, such as programmable logic controllers (PLCs), are used in a wide variety of environments to perform various control functions, such as sensing parameters and providing output signals to various control devices, often based on the sensed parameters. One class of programmable controller is the micro-controller which includes inputs, outputs and a power supply in a single integrated package. A typical micro-controller has relay outputs that utilize relay coils to actuate the relay outputs.

Micro-controllers often are used in environments where it is beneficial to reduce the size of the packaging to the extent possible. It also is advantageous to maximize any reduction in heat generated by the micro-controller, particularly at the relay coils. Generally, the relay coils utilize a relatively large amount of energy, sometimes referred to as power dissipation, that creates undesirable heat. Furthermore, the voltage required to energize a given relay coil is higher than the voltage necessary to hold or maintain the relay coil in an energized state. Thus, unless the voltage at a given relay coil can be reduced, after initial energization, to a level just sufficient to maintain the coil in its energized or actuated state, excess power is generated and lost by the energized coil, largely in the form of unwanted heat.

Attempts have been made to reduce the voltage at a given relay coil after energization. For example, in some relay systems a resistor and capacitor are connected in parallel between the power supply and each relay coil. This arrangement provides an initial higher energization voltage with a lower voltage thereafter. However, in a micro-controller with numerous relay outputs, the multiple resistors and capacitors present size constraints. Additionally, the heat generated by the many resistors during both energization and the hold period contributes to the unwanted heat problem.

It would be advantageous to have a programmable controller able to utilize two different voltage levels in energizing and holding selected relay coils without the use of multiple resistors and capacitors.

SUMMARY OF THE INVENTION

The present invention features a programmable controller that comprises a voltage regulator capable of selectively outputting a high voltage signal and a low voltage signal. A relay is coupled to the voltage regulator and includes a relay coil. The relay coil is capable of being changed from a non-energized to an energized state by the high voltage signal. Additionally, the relay coil may be maintained in the energized state by the low voltage signal. A control is coupled between the voltage regulator and the relay. The control is configured to selectively control both energization of the relay coil and the output of the voltage regulator. The overall configuration substantially reduces the power loss relative to standard relay circuits.

According to another aspect of the invention, an apparatus is provided for reducing the energy and space used by a relay. The apparatus includes a plurality of relay coils and a switching power supply coupled to the plurality of relay coils. Additionally, a control is coupled to the switching power supply and to the plurality of relay coils. The control is configured to selectively energize the plurality of relay coils. Furthermore, the control is designed to provide an output signal to the switching power supply. The output signal causes the switching power supply to output either a high voltage or a low voltage to at least one relay coil of the plurality of relay coils.

According to another aspect of the invention, a method is provided for reducing the power used by a relay coil in a controller, the method includes connecting a controllable voltage regulation device and a plurality of relay coils. The method further includes providing an output signal to the voltage regulation device to cause its output of a high voltage signal. The method also involves providing an energization signal to initiate energization of a desired relay coil by the high voltage signal. After energization, a predetermined period of time is allowed to pass before providing a control signal to the voltage regulation device to cause the voltage regulation device to output a low voltage signal. The low voltage signal is sufficient to maintain the desired relay coil in its energized state.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
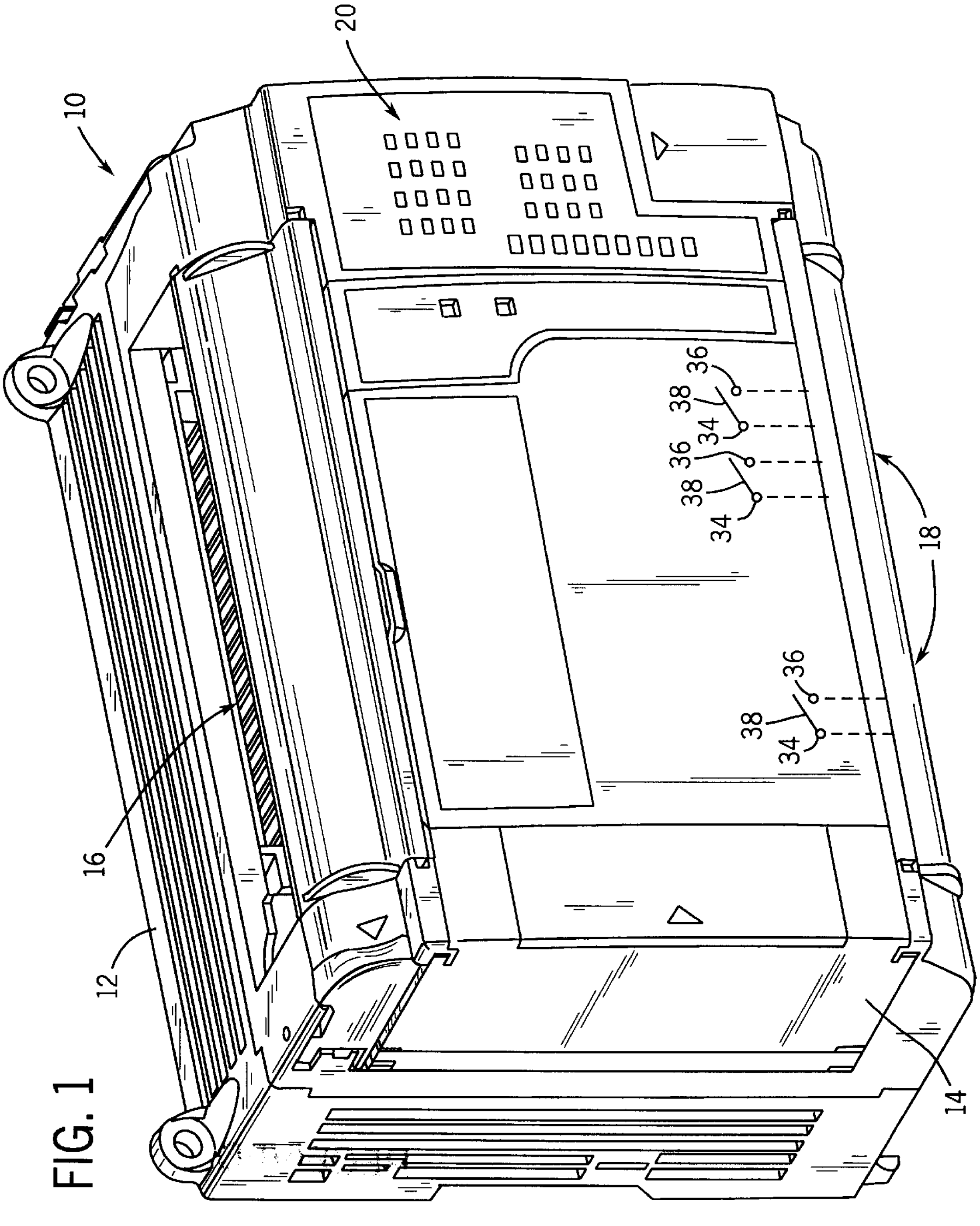
FIG. 1 is a perspective view of an exemplary packaged controller.

Referring generally to FIG. 1, a controller assembly 10 is illustrated, according to an exemplary embodiment of the present invention. In this exemplary embodiment, controller assembly 10 comprises a base unit 12 and a processor unit 14. A plurality of input terminals 16 and a plurality of output terminals 18 are disposed along controller assembly 10. For example, input terminals 16 may be disposed along one side of controller assembly 10 and output terminals 18 along an opposite side, as illustrated in FIG. 1. An LED panel 20 provides an indication to the user regarding which input and output terminals are being activated.

Controller assembly 10 is merely an exemplary embodiment of a potential controller that can be utilized with the invention. A wide variety of forms, styles and configurations of controller can benefit from the present invention. It should be noted, however, that the removal of the traditional resistors and capacitors allows the input terminals 16 and output terminals 18 to more easily be spaced in a tightly packed configuration. This tightly packed configuration facilitates the design and manufacture of controller assemblies 10 that require a smaller footprint. Hence, the present invention is particularly advantageous for use in micro-controllers.

Often, relays are used in conjunction with each output terminal 18 to control current flow through a given output, as is understood by those of ordinary skill in the art. As explained above, conventional relay systems have been problematic in creating excess heat and/or disadvantageous usage of physical space. Both of these problems place limitations on the miniaturization of control systems, such as package PLC systems.

Figure 2:
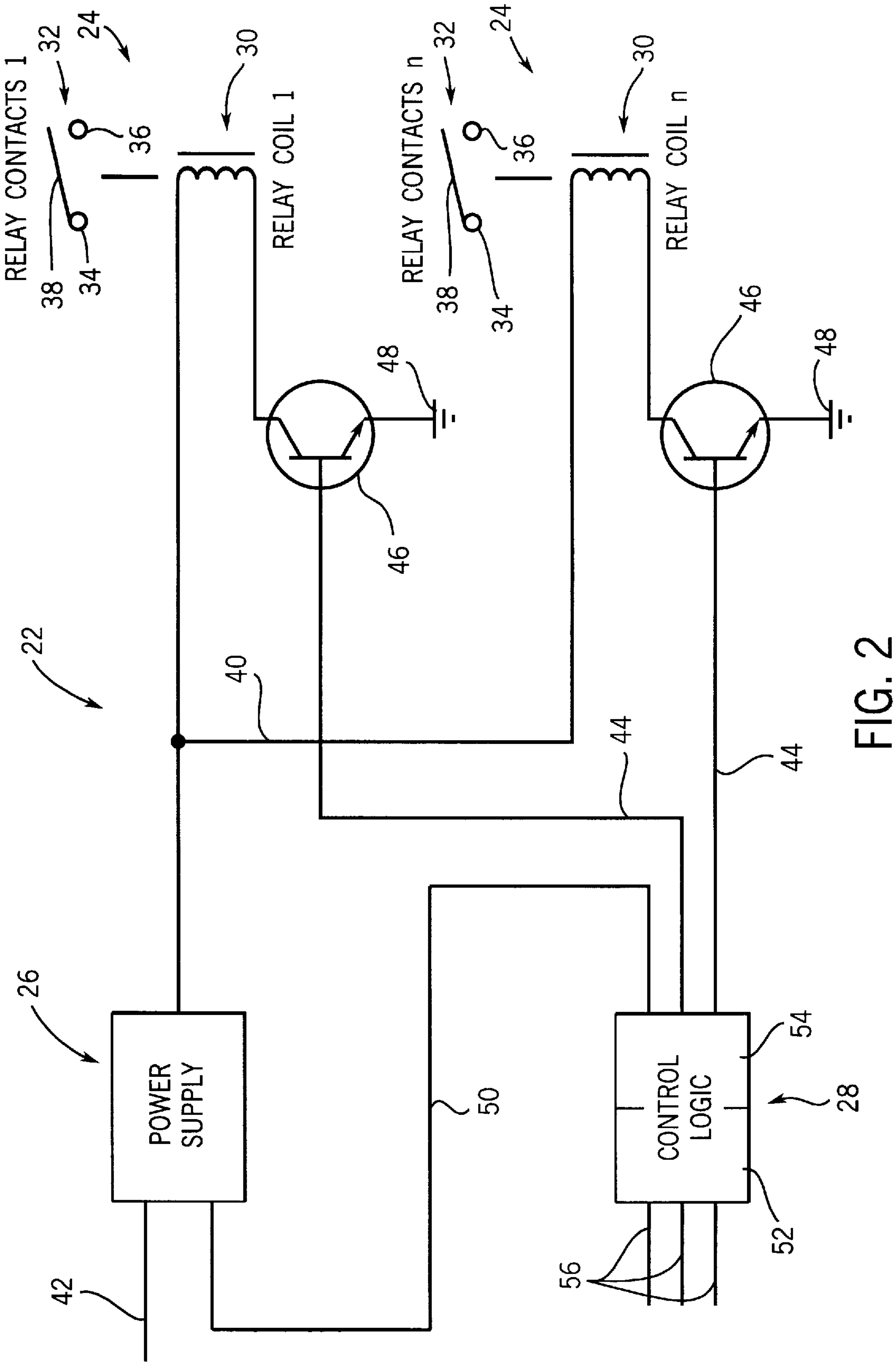
FIG. 2 is an illustration of the power reduction and space saving system, according to a preferred embodiment of the present invention.

As illustrated in FIG. 2, a system 22, according to a preferred embodiment of the present invention, is illustrated. System 22 is designed for use in controller assemblies, such as controller assembly 10, illustrated in FIG. 1. Generally, system 22 comprises a plurality of relays 24, a voltage regulation device 26, and a control 28.

Each relay 24 comprises a relay coil 30 and relay contacts 32. Generally, relay contacts 32 include an input contact 34 and an output contact 36. When relay coil 30 is energized, an actuator 38 is moved to create a conductive path between input contact 34 and output contact 36. This allows, for instance, current flow through a corresponding output terminal 18.

In the embodiment of FIG. 2, only two relay coils are illustrated. However, the actual number of relays in a given system depends on the design parameters of that system. Anywhere from a single relay to a multiple relays can be used in a given controller assembly 10. In a typical programmable logic controller, for instance, there will be numerous inputs, outputs and relays. This permits control of output to a relatively large number of machines or devices. However, only two relays 24 have been illustrated in FIG. 2 to facilitate explanation of the present invention.

Voltage regulation device 26 is coupled to relay coils 30, preferably by a common bus 40. Voltage regulation device 26 may comprise a variety of devices that are able to provide an output signal at a higher voltage and a lower voltage. Preferably, voltage regulation device 26 comprises a power supply, such as a switching power supply, able to provide an output signal at a high voltage and an output signal at a low voltage.

Typically, the high output voltage must be sufficient to energize a given relay coil 30, while the low voltage output must be sufficient to hold or maintain the given relay coil 30 in its energized state. Usually, the low output voltage will be less than that required to energize the relay coil. For example, in a typical system, the high voltage output may be at approximately 24 volts, and the low voltage output may be at approximately 15 volts. If a switching power supply is used for voltage regulation device 26, a power line 42 is connected to device 26 to supply power, for example, in the form of alternating current at a nominal 120 volts.

Control 28 is coupled between voltage regulation device 26 and relays 24. Specifically, control 28 is connected to each relay coil 30 via relay control lines 44 across switching devices 46. In the preferred embodiment, each switching device 46 comprises a transistor. Thus, when an energization signal is output by control 28 to a specific switching device 46, the switching device is closed. This permits the output of power supply 26 to flow through the corresponding relay coil 30 and switching device 46 to a ground 48.

Independent of the control energization signals output to selected switching devices 46, control 28 is configured to output a control signal to device 26 via a control line 50. The output signal to voltage regulation device 26, e.g. a switching power supply, causes the power supply to output either a high voltage signal sufficient to energize one or more of the relay coils 30 or a low voltage signal sufficient to hold or maintain the one or more relay coils 30 in an energized or actuated state.

The control logic of control 28 may be provided in various combinations of hardware and software. However, a preferred arrangement is to provide a microprocessor 52 coupled to an application specific IC (ASIC). The microprocessor 52 is configured to receive a variety of inputs via input lines 56. Based on those inputs, specific signals are output to ASIC 54 which, in turn, controls the output signals to relay coils 30 and voltage regulation device 26 to ensure activation of the desired relays 24. Control 28, however, may be configured in a variety of ways as desired or as required by the specific application of the overall controller assembly 10, as would be understood by those of ordinary skill in the art.

Figure 3:
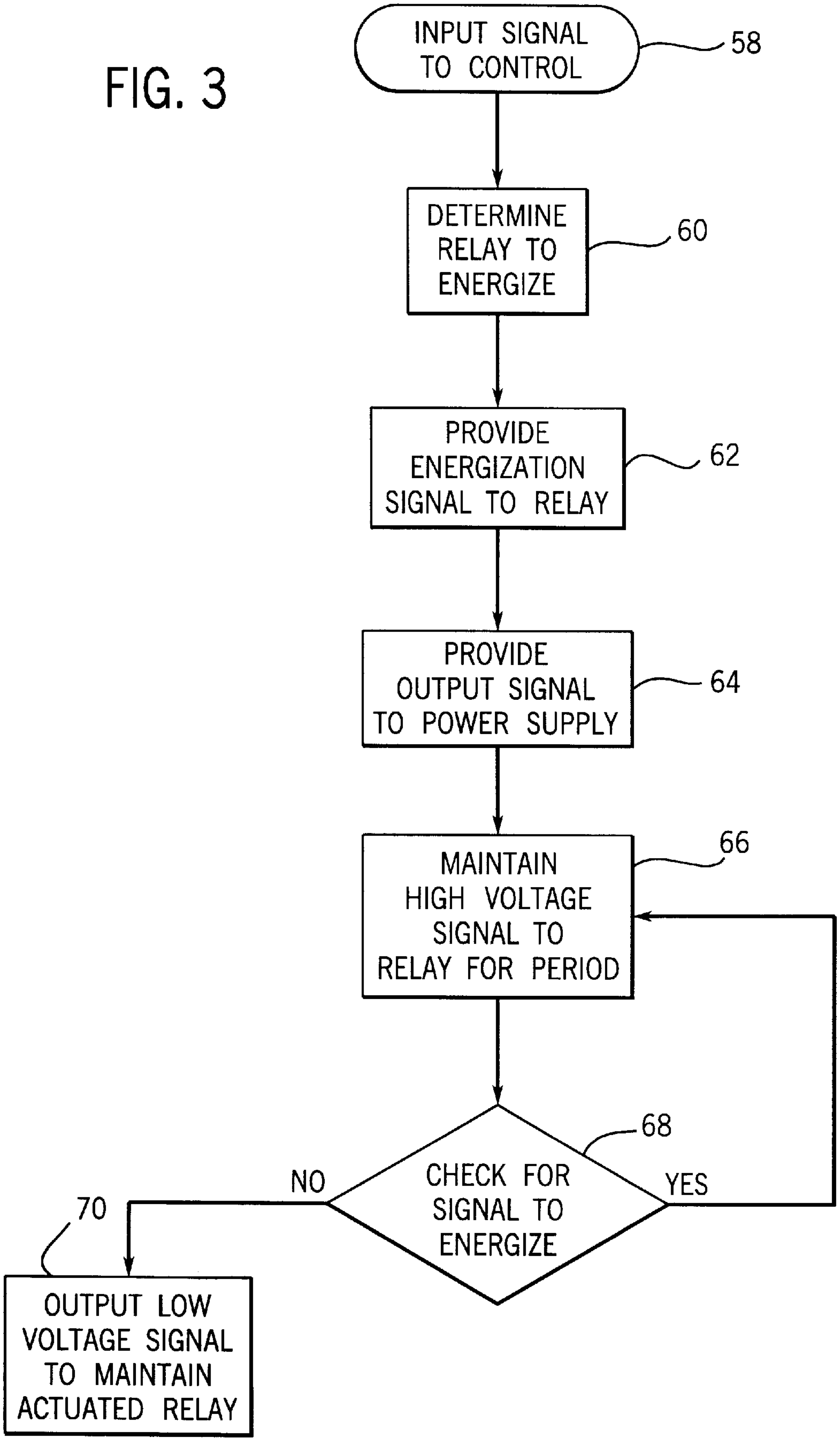
FIG. 3 is a block diagram showing the sequence of events in energizing a selected relay coil, according to a preferred embodiment of the present invention.

The functionality of system 22 may be further explained with reference to the block diagram of FIG. 3. An appropriate signal or signals is provided to controller assembly 10 which is then input to control 28 via input lines 56 as represented in block 58. Upon receipt of the input signal, control 28 determines the appropriate relay coil 30 to energize as represented in block 60. Control 28 then outputs an energization signal to a desired relay coil, as represented in block 62. Specifically, control 28 outputs an energization signal to the appropriate switching device 46 via its corresponding relay control line 44 to close switching device 46 and initiate energization of the corresponding relay coil 30. Additionally, control 28 outputs a control signal to voltage regulation device/power supply 26 via control line 50 as represented in block 64. This causes power supply 26 to output the high voltage signal across bus 40.

The high voltage signal applied across the appropriate relay coil 30 is maintained for a predetermined amount of time, as represented by block 66. Preferably, the predetermined period of time is approximately the relay energization time for a given relay coil 30. At the end of the predetermined period of time, control 28 checks whether input signals have been received requiring the energization of another relay coil 30, as represented in block 68. If control 28 has not been signaled to energize another relay, a signal is provided to voltage regulation device/power supply 26 via control line 50, as represented by block 70. The output signal causes power supply 26 to output a low voltage signal to bus 40. The low voltage signal is sufficient to maintain the energized relay coil 30 in its energized state.

If, on the other hand, additional inputs have been received by control 28 to energize additional relay coils 30, device 26 is signaled to maintain output of the high voltage signal. Thus, the higher voltage required for energization of one or more relay coils 30 is provided only as long as necessary to energize the relay coil or coils required by the input signals received at control 28.

It should be noted that inputs may be provided via input lines 56 to control 28 for opening the connection between select relay contacts 34 and 36, i.e. deenergizing coil 30. In this event, control 28 outputs a signal via control line 44 to the appropriate switch 46. In response to the signal, that switch 46 opens and current flow across the corresponding relay coil is interrupted.

Figure 4:
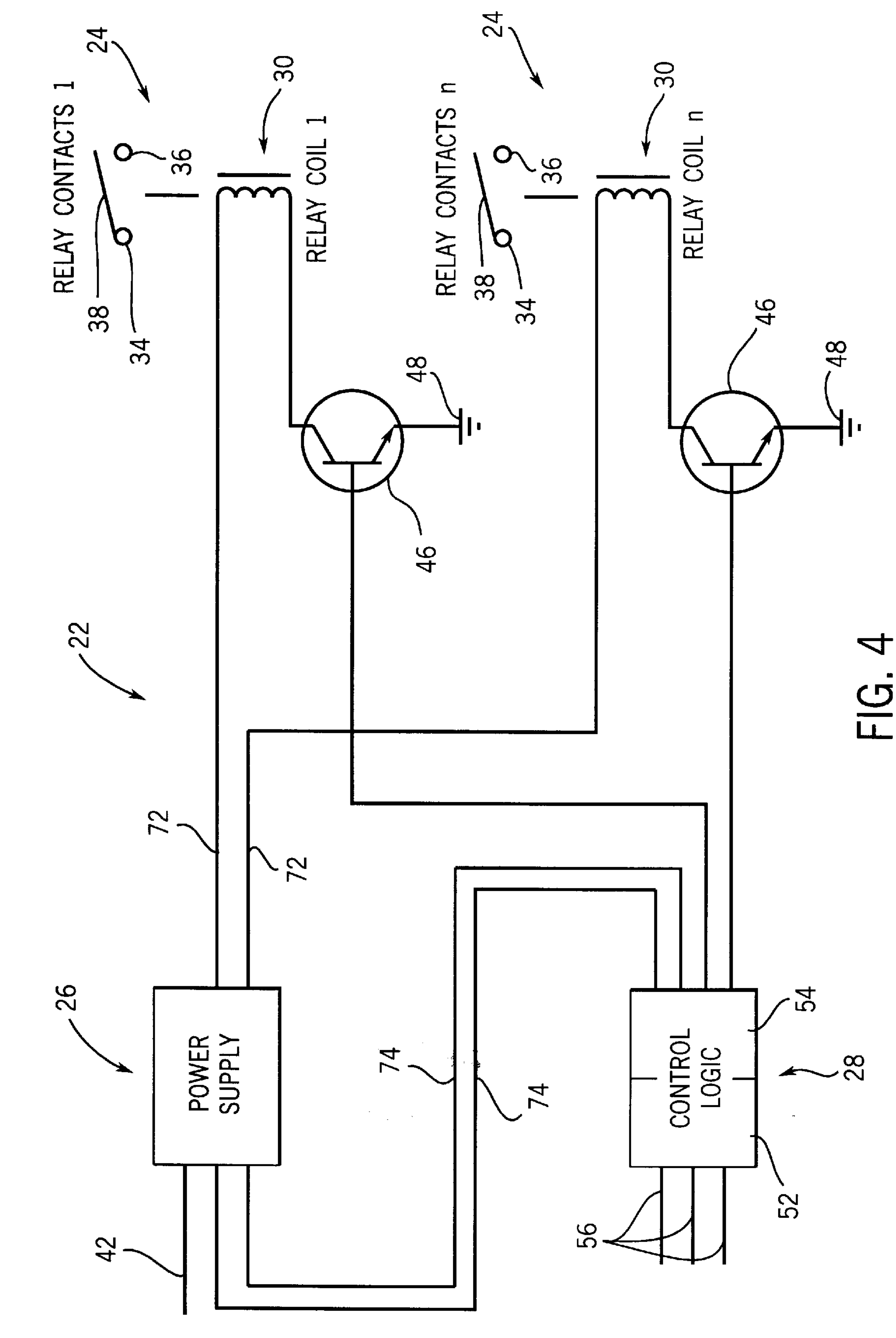
FIG. 4 is an alternate embodiment of the system illustrated in FIG. 2.

An alternate embodiment of the present invention is illustrated in FIG. 4. In this embodiment, voltage regulation device 26 is not coupled to relay coils 30 via a common bus. Instead, device 26 is connected to relay coils 30 via independent control lines 72. Thus, device 26 must be capable of outputting independent high and low voltage signals on each control line 72. Furthermore, ASIC 54 must be configured to provide appropriate output signals to voltage regulation device 26. This may be accomplished, for instance, by providing output signals to voltage regulation device 26 through independent control lines 74. Each control line 74 corresponds to one of the independent control lines 72 connecting device 26 with the appropriate relay coil 30.

It will be understood that the foregoing description is of preferred exemplary embodiments of this invention, and that the invention is not limited to the specific forms shown. For example, a variety of voltage output devices may be utilized; the control may be configured in a variety of ways determined by specific controller applications; a variety of hardware and/or software may be used to create the desired functionality for the control; the number of relays utilized may be increased or decreased; and a variety of relays may be used. These and other modifications may be made in the design and arrangement of the elements without departing from the scope of the invention as expressed in the appended claims.

What is claimed is:

1. A programmable controller, comprising:

a voltage regulator capable of selectively outputting a high voltage signal and a low voltage signal;

a relay coupled to the voltage regulator, the relay having a relay coil that is capable of being changed from a non-energized to an energized state by the high voltage signal and of being maintained in the energized state by the low voltage signal; and a controller coupled between the voltage regulator and the relay, the controller being configured to selectively control both energization of the relay coil and the output of the voltage regulator.

2. The programmable controller as recited in claim 1, wherein the low voltage signal is incapable of changing the relay coil from a non-energized to an energized state.

3. The programmable controller as recited in claim 1, wherein the voltage regulator comprises a power supply.

4. The programmable controller as recited in claim 1, wherein the power supply comprises a switching power supply.

5. The programmable controller as recited in claim 4, wherein the switching power supply is capable of selectively outputting the high voltage signal at approximately 24 volts and the low voltage signal at approximately 15 volts.

6. The programmable controller as recited in claim 1, further comprising a second relay having a second relay coil, the second relay being coupled to the voltage regulator.

7. The programmable controller as recited in claim 6, wherein the first relay and the second relay are connected to the voltage regulator by a common bus.

8. The programmable controller as recited in claim 6, wherein the first relay and the second relay are independently coupled to the voltage regulator to independently receive the high voltage signal and the low voltage signal.

9. The programmable controller as recited in claim 1, wherein the controller is coupled to the relay across a switch.

10. The programmable controller as recited in claim 9, wherein the switch comprises a transistor.

11. An apparatus for reducing the energy and space used by a relay, comprising:

a plurality of relay coils;

a switching power supply coupled to the plurality of relay coils; and a control being coupled to the switching power supply and to the plurality of relay coils to selectively control energization of the plurality of relay coils, wherein the control is configured to provide an output signal to the switching power supply to cause the switching power supply to sequentially output a high voltage and a low voltage to at least one relay coil of the plurality of relay coils.

12. The apparatus as recited in claim 11, wherein the control is coupled to the plurality of relay coils across a plurality of corresponding switches, wherein each switch may be actuated via the control to energize a corresponding relay coil when the output signal of the switching power supply is at the high voltage.

13. The apparatus as recited in claim 12, wherein each switch comprises a transistor.

14. The apparatus as recited in claim 13, wherein each relay coil cooperates with an actuator that selectively opens and closes the conductive path between an input terminal and an output terminal.

15. A method for reducing the power used by a relay coil in a controller, comprising:

connecting a controllable voltage regulation device and a plurality of relay coils;

providing an output signal to the voltage regulation device to cause the voltage regulation device to output a high voltage signal;

providing an energization signal to initiate energization of a desired relay coil by the high voltage signal;

waiting a predetermined period of time; and providing a control signal to the voltage regulation device to cause the voltage regulation device to output a low voltage signal sufficient to maintain the desired relay coil in its energized state.

16. The method as recited in claim 15, further comprising checking whether an energization signal has been provided to another relay coil during the predetermined period of time.

17. The method as recited in claim 15, further comprising applying the high voltage signal to a bus common to the plurality of relay coils.

18. The method as recited in claim 15, wherein the step of connecting comprises connecting a switching power supply to the plurality of coils.

19. The method as recited in claim 15, further comprising providing a second output signal to the voltage regulation device and a second energization signal to a second relay coil to energize the relay coil.

20. The method as recited in claim 19, further comprising providing a second control signal to the voltage regulation device to cause the voltage regulation device to output the low voltage signal.

* * * * *